(12) United States Patent
Fujii et al.

(10) Patent No.: US 7,985,315 B2
(45) Date of Patent: Jul. 26, 2011

(54) PROCESS FOR PRODUCING UNSTRETCHED FILM, PROCESS FOR PRODUCING RESIN-COATED METAL SHEET, AND APPARATUS FOR PRODUCING UNSTRETCHED FILM

(75) Inventors: Tadashi Fujii, Yamaguchi-ken (JP);
Takuji Nakamura, Yamaguchi-ken (JP);
Hiroshi Inazawa, Yamaguchi-ken (JP);
Yasuhiro Matsubara, Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 215 days.

(21) Appl. No.: 10/591,058

(22) PCT Filed: Feb. 25, 2005

(86) PCT No.: PCT/JP2005/003120
§ 371 (c)(1),
(2), (4) Date: Dec. 31, 2007

(87) PCT Pub. No.: WO2005/082598
PCT Pub. Date: Sep. 9, 2005

(65) Prior Publication Data
US 2008/0157424 A1  Jul. 3, 2008

(30) Foreign Application Priority Data

Mar. 1, 2004 (JP) .................................. 2004-055684

(51) Int. Cl.
| | |
|---|---|
| B29C 47/00 | (2006.01) |
| B29B 17/00 | (2006.01) |
| B28B 11/16 | (2006.01) |
| A21C 3/00 | (2006.01) |
| A21C 11/00 | (2006.01) |
| A23G 1/20 | (2006.01) |
| A23G 1/22 | (2006.01) |
| A23G 3/00 | (2006.01) |
| A23P 1/00 | (2006.01) |
| B28B 13/00 | (2006.01) |
| B29C 31/10 | (2006.01) |
| B29C 51/02 | (2006.01) |
| B29C 63/00 | (2006.01) |
| A01J 21/00 | (2006.01) |
| B28B 21/52 | (2006.01) |

(52) U.S. Cl. ................ 156/244.11; 264/37.32; 264/146; 425/133.5; 425/463

(58) Field of Classification Search .................. 156/242, 156/243, 244.11, 244.18, 244.19, 244.23, 156/244.24, 244.25, 246, 248, 249, 250, 156/267, 269, 270, 271, 324, 500; 264/37.32, 264/146, 147, 171.1, 173.11, 173.14, 173.17, 264/173.18, 173.19, 210.1, 210.2, 211.12; 425/130, 131.1, 133.5, 461, 462, 463
See application file for complete search history.

(56) References Cited

U.S. PATENT DOCUMENTS 3,557,262 A * 1/1971 Mitchell et al. ............ 264/37.32
(Continued)

FOREIGN PATENT DOCUMENTS

JP       08-207119         8/1996
(Continued)

*Primary Examiner* — Philip C Tucker
*Assistant Examiner* — Brian R Slawski
(74) *Attorney, Agent, or Firm* — Browdy and Neimark, PPLC

(57) ABSTRACT

A process by which many kinds of unstretched films comprising a thermoplastic resin are produced each in a small amount and high yield. A thermoplastic resin (A) to be formed into an unstretched film and another thermoplastic resin (B) are separately melted by heating. The thermoplastic resin (B) is introduced to each edge part of a T-die (2) for extrusion. The two resins are ejected and extruded on a casting roll so that the thermoplastic rosin (B) is disposed on the side of each edge of the thermally melted thermoplastic resin (A). Thus, an unstretched film (20) is formed which comprises the thermoplastic resin (A) and the thermoplastic resin (B) disposed on the side of each edge of the resin (A). Thereafter, the parts constituted of the thermoplastic resin (B) are removed y cutting to form a target unstretched film (20) consisting only of the thermoplastic resin (A).

5 Claims, 7 Drawing Sheets

U.S. PATENT DOCUMENTS

| | | | | |
|---|---|---|---|---|
| 3,737,354 A | * | 6/1973 | Hattori | 156/229 |
| 4,272,312 A | * | 6/1981 | Thompson | 156/244.11 |
| 4,521,359 A | * | 6/1985 | Tsien | 264/104 |
| 5,716,570 A | * | 2/1998 | Peiffer et al. | 264/146 |
| 2002/0112813 A1 | * | 8/2002 | Kegasawa et al. | 156/244.27 |
| 2004/0108621 A1 | * | 6/2004 | Kegasawa et al. | 264/171.1 |

FOREIGN PATENT DOCUMENTS

| | | |
|---|---|---|
| JP | 08-336884 | 12/1996 |
| JP | 10-139909 | 5/1998 |
| JP | 2003-291258 | 10/2003 |

* cited by examiner

PROCESS FOR PRODUCING UNSTRETCHED FILM, PROCESS FOR PRODUCING RESIN-COATED METAL SHEET, AND APPARATUS FOR PRODUCING UNSTRETCHED FILM

TECHNICAL FIELD

The present invention relates to a process for producing an unstretched film of a thermoplastic resin, a process for producing a resin-coated metal sheet coated and laminated with a thermoplastic resin, and an apparatus for producing an unstretched film of a thermoplastic resin.

BACKGROUND ART

Films of thermoplastic resin include an unstretched film produced by ejecting and extruding a resin heated and melted in an extruder, through its T-die onto a casting roll followed by directly winding it up in coils; a monoaxially-stretched film produced by extruding a resin onto a casting roll and stretching it in the machine direction thereof; and a biaxially-stretched film produced by stretching a cast film both in the machine direction and in the cross direction thereof. All these films that are produced by ejecting and extruding a resin through a T-die onto a casting roll are trimmed by cutting off both their edges so as to have a constant thickness in the cross direction thereof, since both their edges are solidified thicker on the casting roll than the center part of the film owing to the characteristics of the highly-viscous resin melt. In case where films having the same resin composition are mass-produced, the resin of the cut and removed thick parts thereof may be recycled again as the starting material of films by heating and melting the parts in an extruder, and the resin may not be wasted; but in case where a variety of films that differ in their resin composition are produced each in a small amount, then the cut and removed thick parts of the produced films may be recycled as the starting material for the films only when the same films are again produced, and this is a bar to the increase in the yield of films.

For removing both edges of a resin film in the cross direction thereof, for example, a trimming method is proposed as in Patent Reference 1. The method comprises extruding a resin melt onto both surfaces of a metal sheet substrate to coat them, wherein the resin parts (edges) protruding from the metal sheet in the cross direction thereof are removed by nipping them with endless guide belts and tearing off them before the resin is cooled. Regarding the applicability of the method, the cut and removed parts may be applied to only limited use when they are recycled as the starting material of films, since various pigments and fillers are added to the resin. Therefore, in case where a variety of films are produced each in a small amount therein, the method is not expectable for the increase in the yield of films.

For reducing the economical loss of non-recyclable trimmed film wastes, a method is proposed in Patent Reference 2. The method relates to a film having an indispensable requirement of high quality, such as an electrically-insulating film of a biaxially-stretched polypropylene film for production of capacitors; and this comprises heating and melting a propylene polymer B in a first extruder, heating and melting a propylene polymer A in a second extruder, and co-extruding them through a flat sheet die, wherein the propylene polymer A is extruded by feeding it to both sides of the propylene polymer B, the resulting resin film is biaxially stretched, and then the propylene polymer A on both sides of the propylene polymer B are trimmed off. In the method, the propylene polymer B satisfying the indispensable requirement of high quality is used as possible effectively so as not to give trimmed film wastes. In the method, however, the propylene polymer B to be used must be so designed that it is compatible with the propylene polymer A in point of the molecular weight, the residual ash, the melt index and the melting point thereof, and therefore, the use of the method is limited and the method is not applicable to production of films of general-purpose thermoplastic resins.

Information of prior-art references relating to the present application includes the following:
Patent Reference 1: JP-A 2002-127099
Patent Reference 2: JP-A 08-336884

DISCLOSURE OF THE INVENTION

Problems that the Invention is to Solve

The present invention is to provide a process for producing unstretched films of a variety of thermoplastic resins each in a small amount; a process for producing a variety of thermoplastic resin-coated metal sheets each in a small amount; and a process for producing unstretched films of a variety of thermoplastic resins each in a small amount and at high yield.

Means for Solving the Problems

The process for producing unstretched films of the invention to solve the above-mentioned problems comprises heating and melting thermoplastic resins and ejecting and extruding them through an extrusion T-die onto a casting roll to produce an unstretched film, wherein a thermoplastic resin to form an unstretched film and another thermoplastic resin than the thermoplastic resin are separately heated and melted, the other thermoplastic resin is led to both edges of an extrusion T-die, the two resins are ejected and extruded onto the casting roll in such a manner that the other thermoplastic resin can coexist on both sides of the heated and melted thermoplastic resin to thereby form an unstretched film where the other thermoplastic resin coexists on both sides of the thermoplastic resin, and thereafter the other thermoplastic resin part is cut off (claim 1);

In the process for producing an unstretched film of the above (claim 1), the thermoplastic resin and the other thermoplastic resin are heated and melted separately in different extruders, and fed to the resin melt supply ducts connected to the respective extruders, the heated and melted thermoplastic resin and the other thermoplastic resin are fed to a feed block where holes are formed on both sides of the lower part of the duct to which the thermoplastic resin is fed and the end of the duct to which the other thermoplastic resin is fed is connected with each hole formed on both sides thereof, and thereafter these are widened through a manifold connected to the feed block and extruded out through the die lip of the extrusion T-dye onto a casting roll in such a condition that the other thermoplastic resin coexists on both sides of the thermoplastic resin (claim 2);

In the process for producing an unstretched film of the above (claim 1 or 2), in the feed block, the cross section of the lower part of the duct to which the thermoplastic resin is fed is rectangular, and the cross section of the holes to be formed on both sides of the lower part of the duct is rectangular (claim 3);

In the process for producing an unstretched film of the above (claims 1 to 3), the thermoplastic resin and the other thermoplastic resin are ejected out through the extrusion T-die to form the unstretched film in such a manner that the other thermoplastic resin may form only a part inevitably thicker than the part of the thermoplastic resin (claim 4);

In the process for producing an unstretched film of the above (claims 1 to 4), the difference in the melt viscosity between the thermoplastic resin and the other thermoplastic resin is at most 3000 poises at a shear rate of from 20 to 500 sec$^{-1}$ (claim 5);

In the process for producing an unstretched film of the above (claims 1 to 5), the other thermoplastic resin is a colored thermoplastic resin (claim 6).

The process for producing a resin-coated metal sheet of the invention comprises heating and melting thermoplastic resins and ejecting and extruding them through an extrusion T-die onto a metal sheet to coat it by lamination to produce a resin-coated metal sheet, wherein a thermoplastic resin to coat a metal sheet by lamination and another thermoplastic resin than the thermoplastic resin are separately heated and melted, the other thermoplastic resin is led to both edges of an extrusion T-die, the two resins are ejected and extruded onto the metal sheet in such a manner that the other thermoplastic resin melt can coexist on both sides of the heated and melted thermoplastic resin and that the width of the part of the thermoplastic resin is larger than the width of the metal sheet, only the part of the thermoplastic resin is thus laminated on the metal sheet to coat it to give a resin-coated metal sheet, and thereafter the resin parts protruding from both sides of the metal sheet are cut off (claim 7);

In the process for producing a resin-coated metal sheet of the above (claim 7), the thermoplastic resin and the other thermoplastic resin are ejected out through the extrusion T-die onto the metal sheet in such a manner that the other thermoplastic resin coexisting on both sides of the thermoplastic resin may form only a part inevitably thicker than the part of the thermoplastic resin (claim 8);

In the process for producing a resin-coated metal sheet of the above (claims 7 or 8), the difference in the melt viscosity between the thermoplastic resin and the other thermoplastic resin is at most 3000 poises at a shear rate of from 20 to 500 sec$^{-1}$ (claim 9);

In the process for producing a resin-coated metal sheet of the above (claims 7 to 9), the other thermoplastic resin is a colored thermoplastic resin (claim 10).

The apparatus for producing an unstretched film of the invention comprises an extruder (A1) for heating and melting a thermoplastic resin to form an unstretched film, an extruder (B1) for heating and melting another thermoplastic resin than the thermoplastic resin, a duct (A2) for resin melt supply connected to the extruder (A1), a duct (B2) for resin melt supply connected to the extruder (B1), a feed block where two holes are formed on both sides of the lower part of the duct (A2) for resin melt supply and are connected to the duct (B2) for resin melt supply, a manifold, a die lip connected to the manifold, and a T-die connected to the feed block (claim 11);

In the process for producing an unstretched film of the above (claim 11), in the feed block, the cross section of the lower part of the duct to which the thermoplastic resin is fed is rectangular, and the cross section of the holes to be formed on both sides of the lower part of the duct is rectangular (claim 12).

Figure 1:
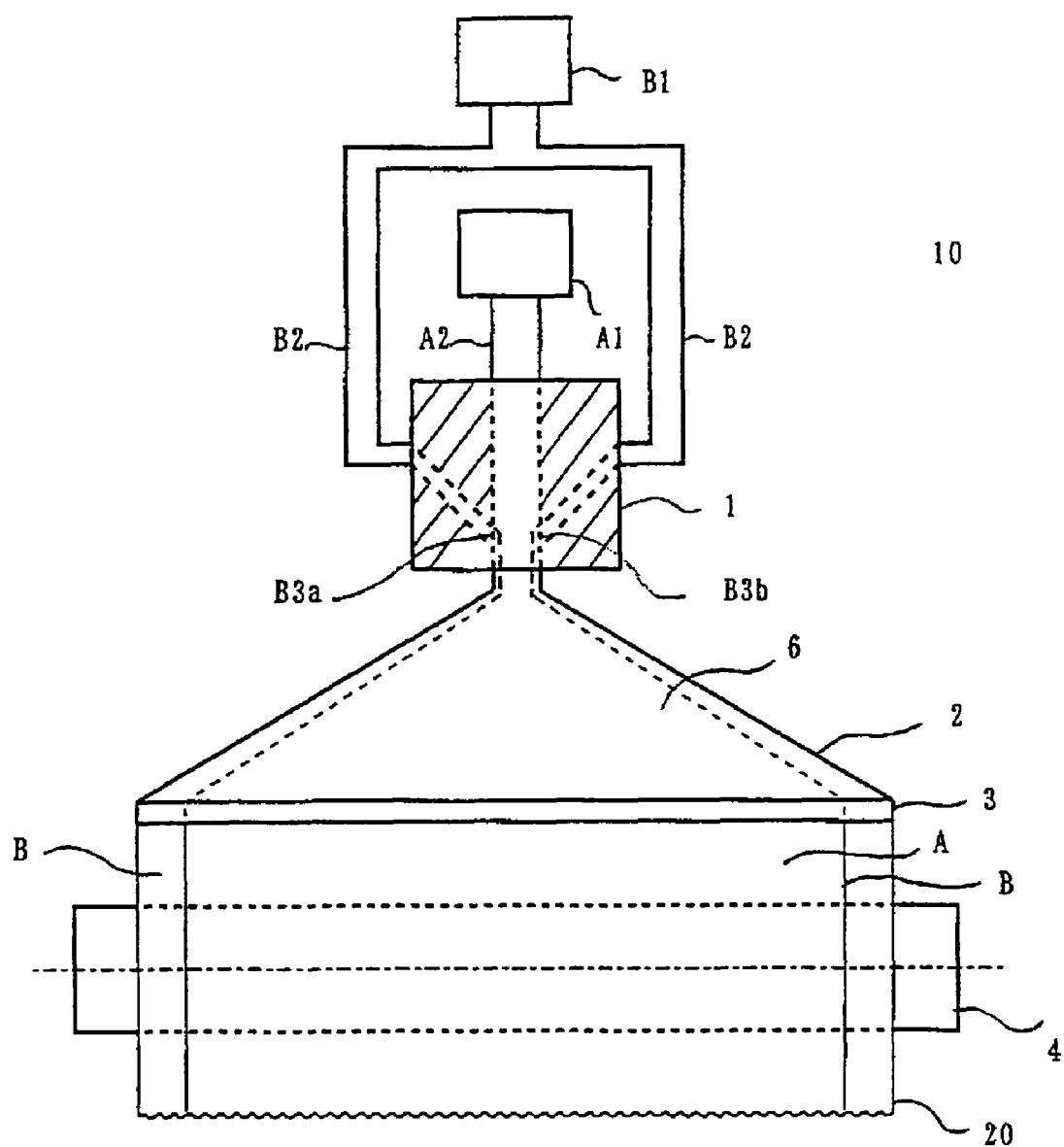
FIG. 1 is an schematic view of an apparatus for producing an unstretched film of the invention.

In the drawings, 1 is a feed block; 2 is a T-die; 3 is a die lip; 4 is a casting (chill) roll; 5 is a lapping part; 6 is a manifold; 10 is an apparatus for producing unstretched film; 15 is a cutting means; 20 is an unstretched film; 30 is a metal sheet; 40 is a resin-coated metal sheet; A and B are a thermoplastic resin; A1 is an extruder; A2 is a duct for resin melt supply; A2R is a part where the duct for resin melt supply and the T-die are connected to each other; B1 is an extruder; B2 is a duct for resin melt supply; B3*a* is a hole; B3*a*R is a part of the resin melt supply duct just before the hole; B3*b* is a hole and B3*b*R is a part of the resin melt supply duct just before the hole.

BEST MODE FOR CARRYING OUT THE INVENTION

The invention is described in detail hereinunder. An object of the unstretched film to be produced according to the production process of the invention is as follows: Using a small number of production devices, films of a variety of resins that differ in the resin composition thereof are produced each in a small amount. The resin to form the intended unstretched film includes a polyolefin resin of one or more polymers or copolymers of 1-alkene having from 2 to 8 carbon atoms, such as low-density polyethylene, middle-density polyethylene, high-density polyethylene, polypropylene, polybutene-1, polypentene-1, polyhexene-1, polyheptene-1, polyoctene-1, ethylene-propylene copolymer, ethylene-butene-1 copolymer, ethylene-hexane copolymer; a polyamide resin such as 6-nylon, 6,6-nylon, 6,10-nylon; and a polyester resin comprising, as the acid component thereof, one or more acids of a dibasic aromatic dicarboxylic acid such as terephthalic acid, isophthalic acid, orthophthalic acid, p-β-oxyethoxybenzoic acid, naphthalene-2,6-dicarboxylic acid, diphenoxyethane-4,4-dicarboxylic acid, 5-sodium-sulfoisophthalic acid; an alicyclic dicarboxylic acid such as hexahydroterephthalic acid, cyclohexanedicarboxylic acid; an aliphatic dicarboxylic acid such as adipic acid, sebacic acid, dimer acid; a polybasic acid such as trimellitic acid, pyromellitic acid, hemimellitic acid, 1,1,2,2-ethane-tetracarboxylic acid, 1,1,2-ethane-tricarboxylic acid, 1,3,5-pentane-tricarboxylic acid, 1,2,3,4-cyclopentane-tetracarboxylic acid, biphenyl-3,4,3', 4'-cyclopentane-tetracarboxylic acid; and, as the alcohol component thereof, one or more diols such as ethylene glycol, propylene glycol, 1,4-butanediol, neopentyl glycol, 1,6-hexylene glycol, diethylene glycol, triethylene glycol, cyclohexanedimethanol, and other polyalcohols such as pentaerythritol, glycerol, trimethylolpropane, 1,2,6-hexanetriol, sorbitol, 1,1,4,4-tetrakis(hydroxymethyl)cyclohexane.

In the invention, the intended thermoplastic resin and the other thermoplastic resin that differs from the intended thermoplastic resin are formed into films by controlling their melt viscosity in the manner to be mentioned hereinunder. Accordingly, the two are not specifically defined in point of the resin composition thereof, and any of the above-mentioned resins may be used for the intended thermoplastic resin and for the other thermoplastic resin that differs from the intended thermoplastic resin and is to coexist on both sides of the intended thermoplastic resin, as combined.

Next described is a process for producing a film where a different thermoplastic resin coexists on both sides of the intended thermoplastic resin, using the process and the apparatus for producing an unstretched film of the invention. FIG. 1 is a schematic view of an apparatus 10 for producing an unstretched film of the invention. The intended thermoplastic resin A is heated and melted in an extruder A1, and fed to a feed block 1 via a duct A2 for resin melt supply for the intended thermoplastic resin A, which is connected to the extruder A1. The other thermoplastic resin B that is to coexist on both sides of the thermoplastic resin A is heated and melted in an extruder B1, and fed to the feed block 1 via two ducts B2 for resin melt supply for the thermoplastic resin B, which are connected to the extruder B1 and which are branched on their way. A duct A2 for resin melt supply for the thermoplastic resin A runs through the feed block 1, and at the lowermost part thereof, it is connected to a T-die 2. In the feed flock 1, a hole B3a and a hole B3b are formed on both sides of the lower part of the duct A2 for resin melt supply for the thermoplastic resin A, and in these holes B3a and B3b, a duct B2 for resin melt supply for the thermoplastic resin B is formed to run through the feed block 1.

The thermoplastic resin A heated and melted in the extruder A1 is fed to the feed block 1 via the duct A2 for resin melt supply, and is extruded toward the T-die 2 connected to the lowermost part of the feed block. The thermoplastic resin B heated and melted in the extruder B1 is fed to the feed block 1 via the duct B2 for resin melt supply, and extruded out into the duct A2 for resin melt supply through holes B3a and B3b formed on both sides of the lower part of the duct A2 for resin melt supply, and the thermoplastic resin B is thus made to coexist on both sides of the thermoplastic resin A. Next, this is widened in the manifold 6 provided inside the T-die 2, and ejected through the die lip 3 onto the casting roll 4 disposed below the T-die 2. In this stage, both edges in the cross direction of the thus-ejected, still molten resin film are inevitably thicker than any other part. Accordingly, the unstretched film 20 is formed in which the thermoplastic resin B thicker than the thermoplastic resin A coexists on both sides of the thermoplastic resin A.

Figure 2:
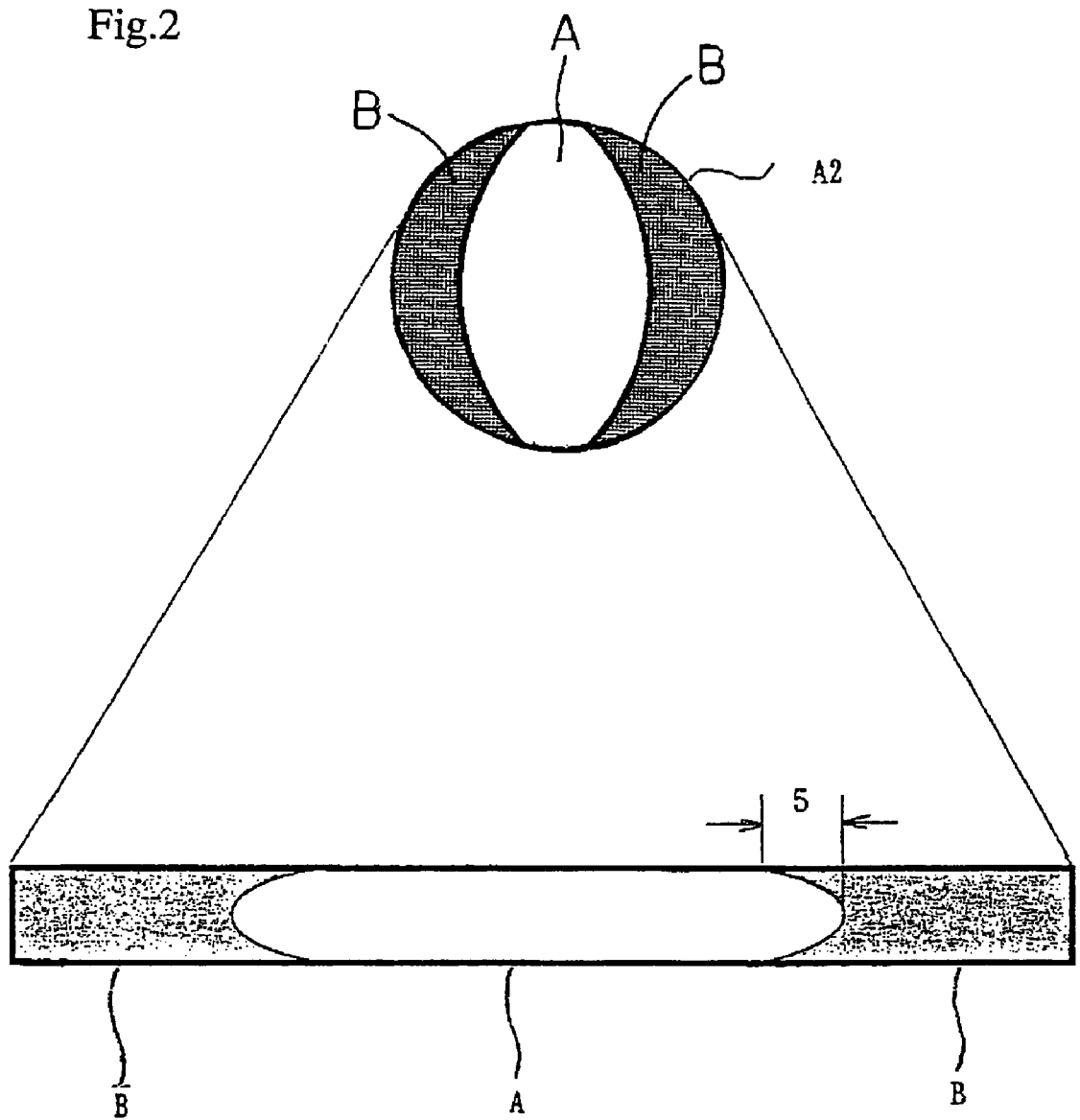
FIG. 2 is a graphical view showing a condition of thermoplastic resins just before extruded to a T-die, and a condition of a formed film.
Figure 3:
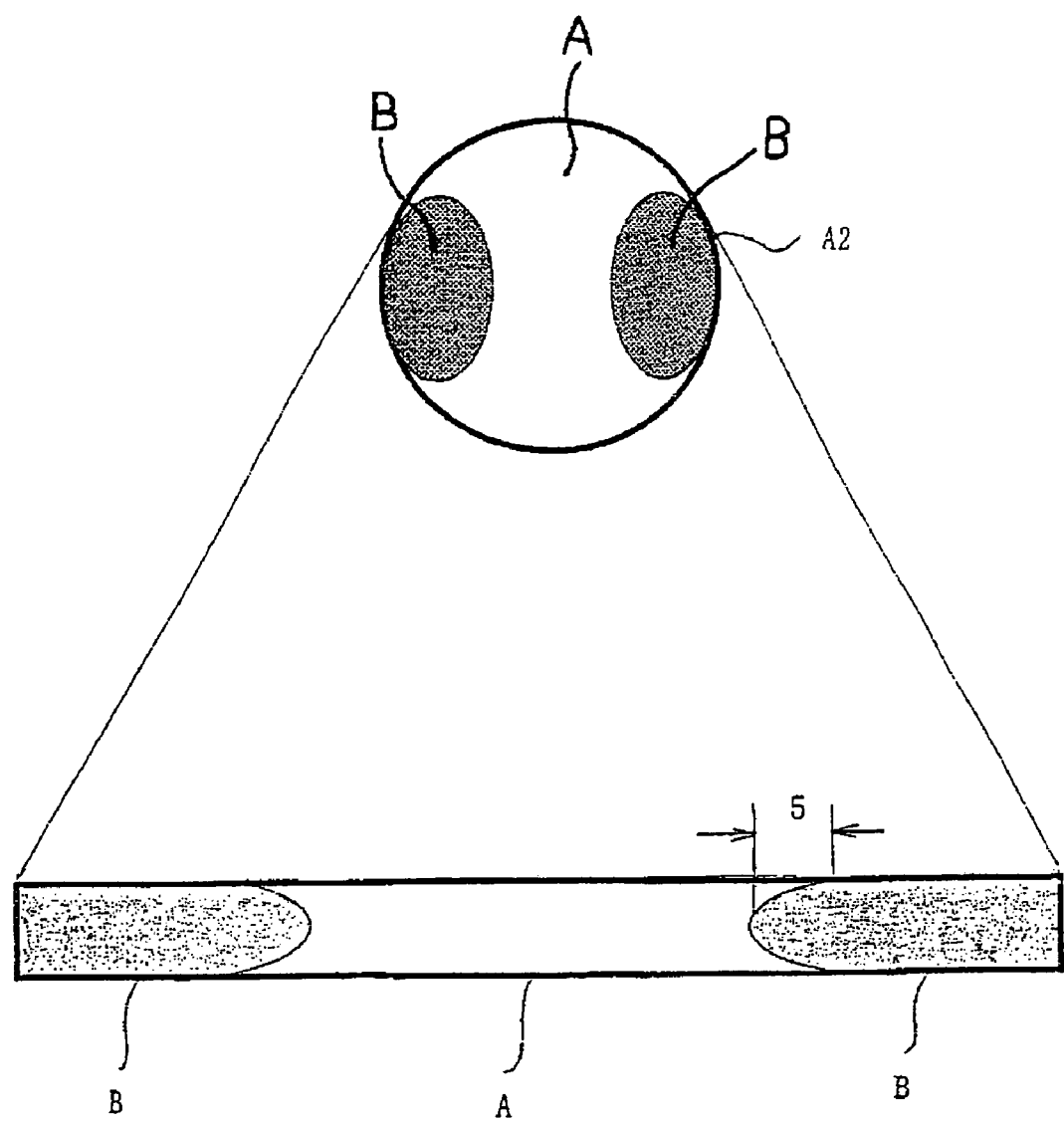
FIG. 3 is a graphical view showing a condition of thermoplastic resin just before extruded to a T-die, and a condition of a formed film.
Figure 4:
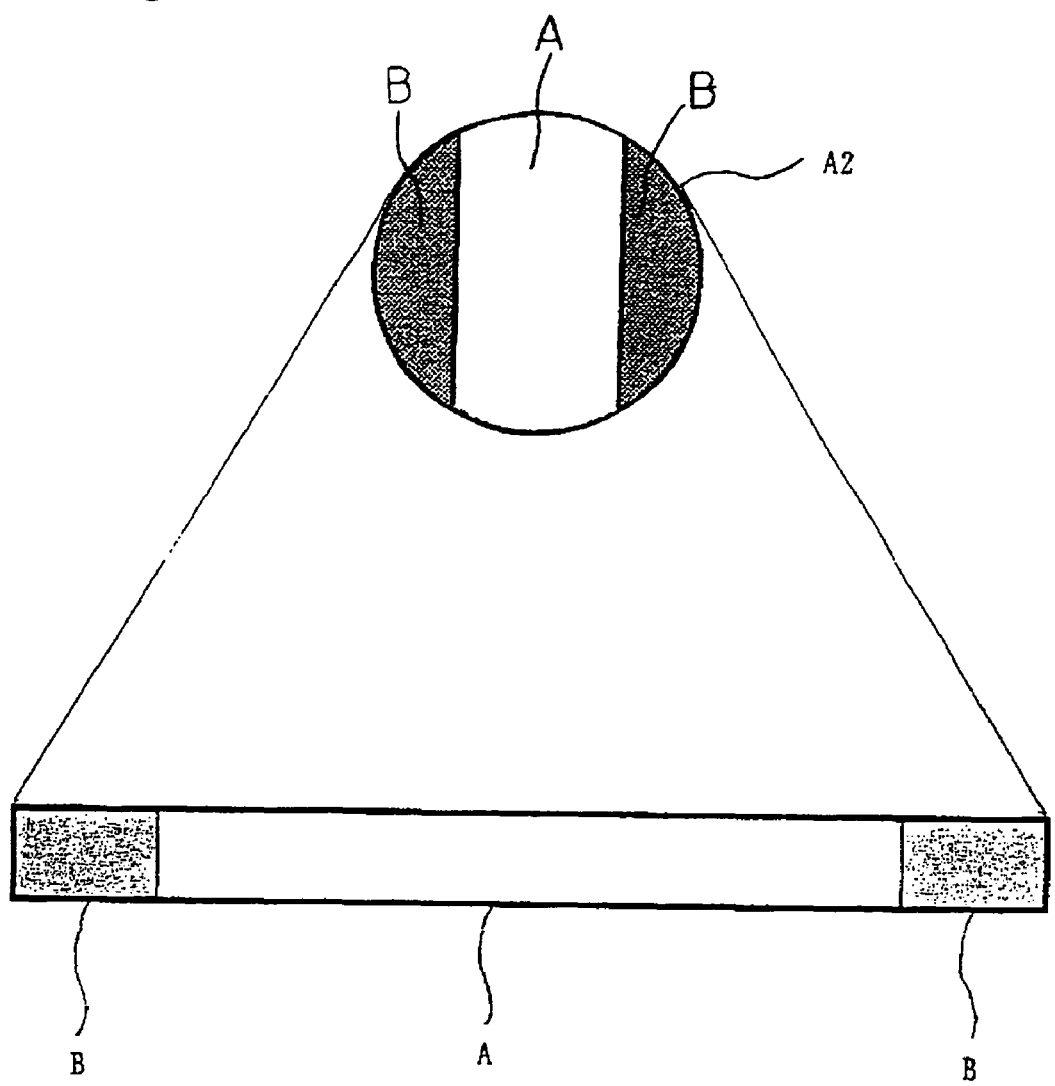
FIG. 4 is a graphical view showing a condition of thermoplastic resins just before extruded to a T-die, and a condition of a formed film.

For facilitating the working step in film formation, when the duct A2 and the duct B2 for resin melt supply both have a circular cross section, then the thermoplastic resin B coexists on both sides of the thermoplastic resin A, having a cross-sectional profile as in FIG. 2 to FIG. 4 in accordance with the viscosity difference between the thermoplastic resin A and the thermoplastic resin B, at the lowermost part of the duct A2 for resin melt supply just before the T-die 2. FIG. 2 to FIG. 4 are graphical views each showing the condition of the thermoplastic resin A and the thermoplastic resin B just before extrusion of their resin melts into the T-die 2 through the duct A2 for resin melt supply in the feed block 1 and through the holes B3a and B3b formed on both sides of the lower part of the resin melt supply duct A2, and the condition of an unstretched film formed after the resin ejection through the T-die 2. In these, the upper view is a cross-sectional view showing the condition of the thermoplastic resin A and the thermoplastic resin B in the lower part of the duct A2 for resin melt supply; and the lower view shows the cross section of the unstretched film formed after the resin ejection through the T-die 2.

In case where the melt viscosity of the intended thermoplastic resin A is extremely larger than the melt viscosity of the other thermoplastic resin B, then the thermoplastic resin B is to coexist on both sides of the thermoplastic resin A, having the cross-sectional profile as in the upper view of FIG. 2; and in this condition, when the resin melts are widened through the manifold 6 and then ejected out via the die lip 3 of the T-die 2, then they form a lapping part 5 where the thermoplastic resin B has stepped in the upper and lower edges of the thermoplastic resin A, as in the lower view of FIG. 2.

In case where the melt viscosity of the intended thermoplastic resin A is extremely smaller than the melt viscosity of the other thermoplastic resin B, then the thermoplastic resin B is to coexist on both sides of the thermoplastic resin A, having the cross-sectional profile as in the upper view of FIG. 3; and in this condition, when the resin melts are widened through the manifold 6 and then ejected out via the die lip 3 of the T-die 2, then they form a lapping part 5 where the thermoplastic resin B has stepped in the upper and lower edges of the thermoplastic resin A, as in the lower view of FIG. 3.

These lapping parts 5 where the thermoplastic resin A and the thermoplastic resin B overlap with each other must be removed as they are unacceptable in products. In case where the lapping part 5 is great, then the area to be removed is large and the yield of the intended thermoplastic resin A is low. For facilitating the detection of the lapping part 5, it is desirable that a color pigment is added to the other thermoplastic resin B to color it. In case where the thermoplastic resin A is a color resin, then a color pigment of which the color differs from the color of the thermoplastic resin A may be preferably added to the thermoplastic resin B or no pigment may be preferably added thereto so that the resin B could be a transparent resin.

For minimizing the lapping part of the thermoplastic resin A and the thermoplastic resin B, in the invention, the difference in the melt viscosity between the intended thermoplastic resin A and the thermoplastic resin B that pass through the feed block and the T-die may be at most 3000 poises at a shear rate of from 20 to 500 $\sec^{-1}$, whereby the thermoplastic resin B may coexist on both sides of the thermoplastic resin A, having a cross-sectional profile as in the upper view of FIG. 4; and in this condition, when the resin melts are widened through the manifold 6 and then ejected out via the die lip 3 of the T-die 2, then they may give a film, substantially having no lapping part as in the lower view of FIG. 4. For controlling the melt viscosity difference to fall within the above-mentioned range, heaters and temperature sensors may be provided around the duct A2 for melt resin supply, the duct B2 for resin melt supply, the feed block 1 and the manifold 6 of the T-die 2, whereby the heating temperature is controlled by the use of a temperature controller in such a manner that the resin having a higher melt viscosity may be heated at a higher temperature while the resin having a lower melt viscosity may be heated at a lower temperature, and the melt viscosity difference may be thereby controlled to be at most 3000 poises at a shear rate of from 20 to 500 $\sec^{-1}$.

In case where the melt viscosity difference between the thermoplastic resin A and the thermoplastic resin B is controlled to be at most 3000 poises at a shear rate of from 20 to 500 $\sec^{-1}$, and in case where the melt viscosity of the thermoplastic resin A is larger than the melt viscosity of the thermoplastic resin B and where the thermoplastic resin A alone ejected out through the die lip 3 of the T-die 2 may pulsate whereby the formed film width may periodically greatly fluctuate, then the thermoplastic resin B having a larger melt viscosity than the thermoplastic resin A may be made to coexist on both sides of the thermoplastic resin A whereby the pulsation of the thermoplastic resin may be inhibited and the fluctuation of the film width may be reduced. Accordingly, the intended film may be formed at a higher speed than the resin film of the thermoplastic resin A alone.

Figure 5:
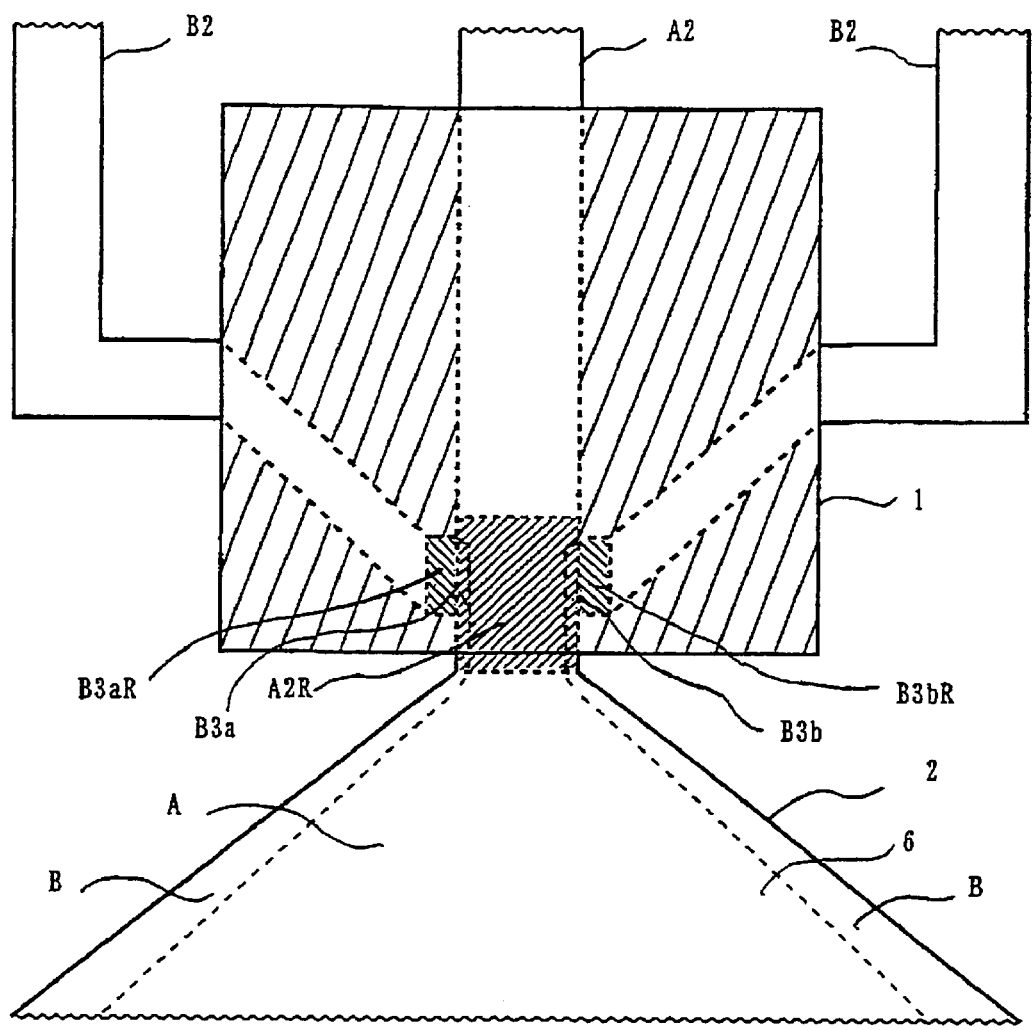
FIG. 5 is a schematic cross-sectional view showing a meeting place of resins in a feed block.
Figure 6:
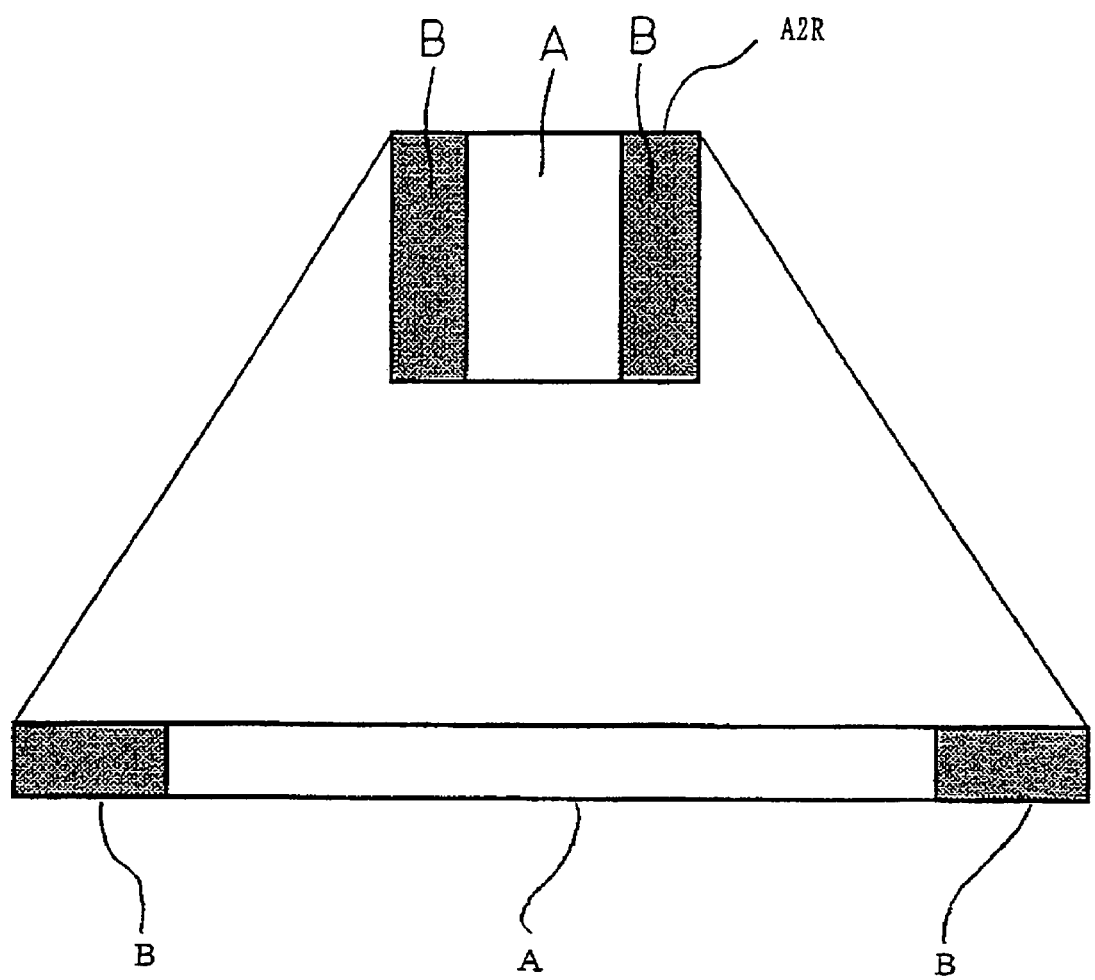
FIG. 6 is a graphical view showing a condition of thermoplastic resins just before extruded to a T-die, and a condition of a formed film.

As in FIG. 5, in case where the part A2R from just above the holes B3a and B3b, at which the ducts B2 for resin melt supply for the thermoplastic resin B meet the duct A2 for resin melt supply for the thermoplastic resin A at both sides of the duct A2 in the feed block 1, to the connection part to the T-die at the lowermost part of the duct A2, and the parts B3aR and B3bR just before the holes B3a and B3b of the duct B2 (all patched parts) are designed to have a rectangular cross section, then the shape of the thermoplastic resin B that is to coexist on both sides of the thermoplastic resin A before widened through the manifold in the T-die may be readily controlled to have the cross-sectional profile (A2R) shown in the upper view of FIG. 6. Accordingly, when the resin melts are widened in that condition through the manifold 6 and ejected out via the die lip 3 of the T-die 2, then they may give a film substantially having no lapping part, as in the lower view of FIG. 6.

Figure 7:
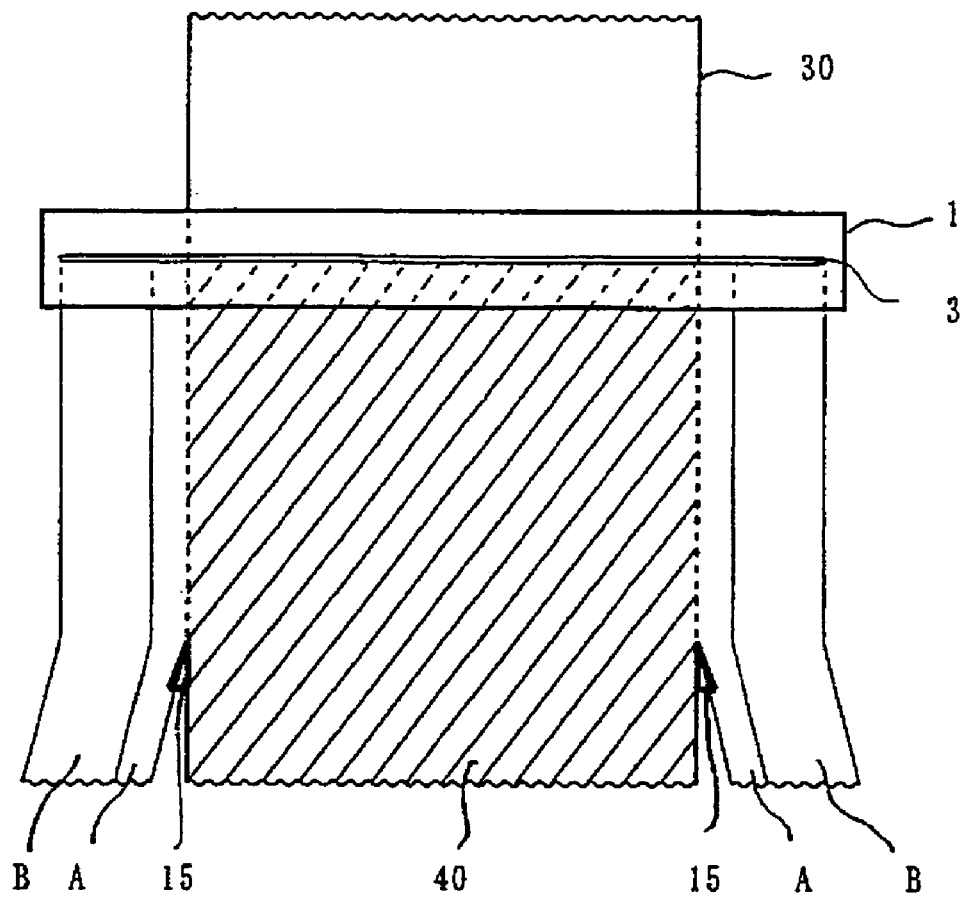
FIG. 7 is a schematic plan view showing a process for producing a resin-coated metal sheet of the invention.

Next described is the process for producing a resin-coated metal sheet of the invention. FIG. 7 is a schematic plan view showing the top of a metal sheet to be coated with resin, in which a metal sheet 30 runs continuously in the downward direction from the above on the figure, and a thermoplastic resin A and a thermoplastic resin B are extruded out through the die lip 3 of a T-die 1, onto the metal sheet 30 to coat it by lamination in such a manner that the resin B is to coexist on both sides of the resin A. The T-die 1 is so designed that the ejection width of the die lip 3 thereof is larger than the width of the metal sheet 30. Before the thermoplastic resin A and the thermoplastic resin B are ejected through the die lip 3 of the T-die 1, they are processed in the same manner as in the process for producing an unstretched film of the invention mentioned above, and are formed into a molten film. Then, the resins are ejected out onto the metal sheet 30 to coat it by lamination in such a manner that the thermoplastic resin B is to coexist on both sides of the thermoplastic resin A to form a film inevitably thicker than the film of the thermoplastic resin A and that the width of the part of the thermoplastic resin A is larger than the width of the metal sheet 30. The hatched part in the drawing indicates the part of the metal sheet 30 coated with the thermoplastic resin A by lamination. In that manner, a resin-coated metal sheet 40 is obtained, in which the metal sheet 30 is coated with a part of the thermoplastic resin A alone by lamination, and then the thermoplastic resin B and the part of the thermoplastic resin A protruding out from both edges of the metal sheet 30 are cut off, using a cutting tool 15 such as a cutter. In that manner, the entire width of the metal sheet 30 is coated by lamination with the intended thermoplastic resin A alone having a uniform thickness. The extrusion amount of the thermoplastic resin A may be controlled so that the part of the thermoplastic resin A to protrude out from both edges of the metal sheet 30 could be minimized, whereby the resin-coated metal sheet can be produced with substantially no loss of the intended thermoplastic resin A.

EXAMPLES

The invention is described in more detail with reference to the following Examples.

Example 1

As a thermoplastic resin A to be formed into an unstretched film, a polyester resin (ethylene terephthalate/ethylene isophthalate copolymer (ethylene isophthalate, 10 mol %); melting point, 220° C.; melt viscosity at a temperature of 260° C. and at a shear rate of 100 sec$^{-1}$, 7500 poises) was heated and melted at 260° C., using an extruder A1. As a thermoplastic resin B to coexist on both sides of the thermoplastic resin A, a resin (melt viscosity at a temperature of 200° C. and at a shear rate of 100 sec$^{-1}$, 4500 poises) prepared by adding 25% by weight of a color component TiO$_2$ to polyethylene (melting point, 145° C.) was heated and melted at 200° C., using an extruder B1. Next, the heated and melted thermoplastic resin A was fed from the extruder A1 to a feed block 1, via one resin melt supply duct A2 heated at 260° C. by a neighboring heater; and the heated and melted thermoplastic resin B was fed from the extruder B1 thereto, via two resin melt supply ducts B2 each heated at 200° C. by a neighboring heater. The resin melt supply duct A2 runs through the center of the feed block 1. Via the holes B3a and B3b formed on both sides of the lower part of the duct A2 to communicate with the resin melt supply ducts B2, the thermoplastic resin B was extruded out into the resin melt supply duct A2 whereby the thermoplastic resin B was made to coexist on both sides of the thermoplastic resin A. Next, the resin melts were widened through the manifold 6 provided inside the T-die 2 in such a manner that the width of the part of the thermoplastic resin A after film formation could be about 80 cm and the width of the part of the thermoplastic resin B on both sides of the thermoplastic resin A could be about 10 cm, and thereafter dropped via the die lip 3 disposed below the T-die 2, onto a continuously-rotating casting roll (chill roll) 4 and cooled and solidified thereon to give a resin film having a width of about 1 m. Just before the feed block 2, the resin temperature and the resin melt viscosity at a shear rate of 100 sec$^{-1}$ were as follows: Thermoplastic resin A: 260° C., about 6500 poises. Thermoplastic resin B (with TiO$_2$ added): 200° C., about 5000 poises. Thus formed, the film had substantially no lapping part 5 of the thermoplastic resin A and the thermoplastic resin B. Accordingly, at the position of 39 cm on both sides from the center of the resin film, the film was trimmed on both sides thereof with a cutter to give an unstretched resin film of the thermoplastic resin A alone having a width of 78 cm, and this was wound up around a coiler.

Example 2

As a thermoplastic resin A, a polyester resin (ethylene terephthalate/ethylene isophthalate copolymer (ethylene isophthalate, 15 mol %); melting point, 215° C.; melt viscosity at a temperature of 260° C. and at a shear rate of 100 sec$^{-1}$, 6000 poises) was heated and melted at 260° C., using an extruder A1. As a thermoplastic resin B, a resin (melt viscosity at a temperature of 200° C. and at a shear rate of 100 sec$^{-1}$, 4500 poises) prepared by adding 20% by weight of a color component TiO$_2$ to polyethylene (melting point, 160° C.) was heated and melted at 200° C., using an extruder B1. Next, in the same manner as in Example 1 except that the width of the part of the thermoplastic resin A after film formation could be about 90 cm and the width of the part of the thermoplastic resin B on both sides of the thermoplastic resin A could be about 5 cm, the thermoplastic resin A and the thermoplastic resin B were ejected out and dropped onto a chill roll 4 and cooled and solidified thereon to form a resin film having a width of about 1 m. Just before the feed block 2, the resin temperature and the resin melt viscosity at a shear rate of 100 sec$^{-1}$ were as follows: Thermoplastic resin A: 260° C., about 5500 poises. Thermoplastic resin B (with TiO$_2$ added): 200° C., about 4500 poises. Thus formed, the film had substantially no lapping part 5. Accordingly, at the position of 44 cm on both sides from the center of the resin film, the film was trimmed on both sides thereof with a cutter to give an unstretched resin film of the thermoplastic resin A alone having a width of 88 cm, and this was wound up around a coiler.

Comparative Example 1

As a thermoplastic resin A, a polyester resin (ethylene terephthalate/ethylene isophthalate copolymer (ethylene isophthalate, 5 mol %); melting point, 240° C.; melt viscosity at a temperature of 260° C. and at a shear rate of 100 $sec^{-1}$, 8000 poises) was heated and melted at 260° C., using an extruder A1. As a thermoplastic resin B, a resin (melt viscosity at a temperature of 200° C. and at a shear rate of 100 $sec^{-1}$, 4000 poises) prepared by adding 20% by weight of a color component $TiO_2$ to polyethylene (melting point, 140° C.) was heated and melted at 200° C., using an extruder B1. Next, in the same manner as in Example 1 except that the width of the part of the thermoplastic resin A after film formation could be about 80 cm and the width of the part of the thermoplastic resin B on both sides of the thermoplastic resin A could be about 10 cm, the thermoplastic resin A and the thermoplastic resin B were ejected out and dropped onto a chill roll 4 and cooled and solidified thereon to form a resin film having a width of about 1 m. Just before the feed block 2, the resin temperature and the resin melt viscosity at a shear rate of 100 $sec^{-1}$ were as follows: Thermoplastic resin A: 260° C., about 7500 poises. Thermoplastic resin B (with $TiO_2$ added): 200° C., about 3500 poises. Thus formed, the film had a lapping part 5 where the thermoplastic resin B had stepped in the upper and lower edges of the thermoplastic resin A, as in FIG. 3. Therefore, the resin on both sides of the thermoplastic resin A including the lapping part must be cut off, and at the position of 30 cm on both sides from the center of the resin film, the film was trimmed on both sides thereof. As a result, the width of the unstretched resin film of the thermoplastic resin A alone obtained herein was only 60 cm.

Comparative Example 2

As a thermoplastic resin A, the same polyester resin as that used in Example 2 was heated and melted at 265° C., using an extruder A1. As a thermoplastic resin B, a resin (melt viscosity at a temperature of 260° C. and at a shear rate of 100 $sec^{-1}$, 9700 poises) prepared by adding 20% by weight of a color component $TiO_2$ to polyethylene terephthalate (melting point, 255° C.) was heated and melted at 265° C., using an extruder B1. Next, in the same manner as in Example 1 except that the thermoplastic resin A was extruded out from the extruder A1 via one resin melt supply duct A2 heated at 260° C. with a neighboring heater and the thermoplastic resin B was from the extruder B1 via branched two resin melt supply ducts B2 each heated at 260° C., both through the feed block in such a manner that a resin film having the thermoplastic resin B (with $TiO_2$ added) coexisting on both sides of the thermoplastic resin A after their extrusion through the T-die could be obtained, and that the width of the part of the thermoplastic resin A after the film formation could be about 80 cm and the width of the part of the thermoplastic resin B on both sides of the thermoplastic resin A could be about 10 cm; the thermoplastic resin A and the thermoplastic resin B were ejected out and dropped onto a chill roll 4 and cooled and solidified thereon to form a resin film having a width of about 1 m. Just before the feed block 2, the resin temperature and the resin melt viscosity at a shear rate of 100 $sec^{-1}$ were as follows: Thermoplastic resin A: 260° C., about 6000 poises. Thermoplastic resin B (with $TiO_2$ added): 260° C., about 9500 poises. Thus formed, the film had a lapping part 5 where the sides of the thermoplastic resin A had stepped in the upper and lower edges of the thermoplastic resin B, as in FIG. 4. Therefore, the resin on both sides of the thermoplastic resin A including the lapping part must be cut off, and at the position of 35 cm on both sides from the center of the resin film, the film was trimmed off on both sides thereof. As a result, the width of the unstretched resin film of the thermoplastic resin A alone obtained herein was only 70 cm.

Example 3

In the same film-forming apparatus as that used for production of the unstretched film in Examples 1 and 2 and Comparative Examples 1 and 2, a metal sheet, or that is, a zinc-plated steel sheet having a thickness of 0.3 mm and a width of 75 cm was continuously introduced, as uncoiled from an uncoiler, in place of the chill roll 4 therein. In the same manner as in Example 1, the same thermoplastic resins A and B as those in Example 1 were melted and heated, and ejected out onto the zinc-plated metal sheet to coat it by lamination, through the die lip 3 disposed below the T-die 2 in such a manner that the thermoplastic resin B could coexist on both sides of the thermoplastic resin A. The resin film thus formed by ejection, in which the thermoplastic resin B coexisted on both sides of the thermoplastic resin A, had an overall width of about 1 m in such a manner that the width of the part of the thermoplastic resin A was about 80 cm and the width of the part of the thermoplastic resin B on both sides of the thermoplastic resin A was about 10 cm. On both sides in the cross direction of the zinc-plated steel sheet, a part of the thermoplastic resin A and all the thermoplastic resin B protruded out, and the protruding resin parts were cut off with a cutter. Thus produced, the resin-coated, zinc-plated steel sheet in which the entire surface of the zinc-plated steel sheet was coated with the thermoplastic resin A by lamination thereon was coiled around a coiler.

INDUSTRIAL APPLICABILITY

The process for producing an unstretched film of the invention comprises heating and melting thermoplastic resins and ejecting and extruding them through an extrusion T-die onto a casting roll to produce an unstretched film, wherein a thermoplastic resin to form an unstretched film and another thermoplastic resin than the thermoplastic resin are separately heated and melted, the other thermoplastic resin is led to both edges of an extrusion T-die, the two resins are ejected and extruded onto the casting roll in such a manner that the other thermoplastic resin melt can coexist on both sides of the heated and melted thermoplastic resin to thereby form an unstretched film where the other thermoplastic resin coexists on both sides of the intended thermoplastic resin, and thereafter the other thermoplastic resin part that is formed to be inevitably thicker than the intended thermoplastic resin part is cut off. Accordingly, in the process, the intended thermoplastic resin part is not almost cut off; and the process gives unstretched films of a variety of thermoplastic resins that differ in the resin composition thereof, each in a small amount and at high yield.

The process for producing a resin-coated metal sheet of the invention comprises heating and melting thermoplastic resins and ejecting and extruding them through an extrusion T-die onto a metal sheet to coat it by lamination to produce a resin-coated metal sheet, wherein a thermoplastic resin to coat a metal sheet by lamination and another thermoplastic resin than the thermoplastic resin are separately heated and melted, the other thermoplastic resin is led to both edges of an extrusion T-die, the two resins are ejected and extruded onto the metal sheet in such a manner that the other thermoplastic resin melt can coexist on both sides of the heated and melted, intended thermoplastic resin and that the width of the part of the thermoplastic resin is larger than the width of the metal sheet, only the part of the intended thermoplastic resin is thus laminated on the metal sheet to coat it to give a resin-coated metal sheet, and thereafter the resin parts protruding from both sides of the metal sheet, which are formed to be inevitably thicker than the intended thermoplastic resin part, are cut off. Accordingly, in the process, the intended thermoplastic resin part is not almost cut off, and the entire surface of the metal sheet is coated with it; and the process gives a resin-coated metal sheet substantially with no loss of the intended thermoplastic resin.

The apparatus for producing an unstretched film of the invention comprises an extruder (A1) for heating and melting a thermoplastic resin to form an unstretched film, an extruder (B1) for heating and melting another thermoplastic resin than the thermoplastic resin, a duct (A2) for resin melt supply connected to the extruder (A1), a duct (B2) for resin melt supply connected to the extruder (B1), a feed block where two holes are formed on both sides of the lower part of the duct (A2) for resin melt supply and are connected to the duct (B2) for resin melt supply, a manifold, a die lip connected to the manifold, and a T-die connected to the feed block. In case where intended unstretched films are formed by the use of the apparatus for unstretched film production of the invention, then an unstretched film having another thermoplastic resin coexisting on both sides of the intended thermoplastic resin may be formed, and thereafter the other thermoplastic resin part that is formed to be inevitably thicker than the intended thermoplastic resin part may be cut off. Accordingly, in the apparatus, the intended thermoplastic resin part is not almost cut off; and unstretched films of a variety of thermoplastic resins that differ in the resin composition thereof can be produced each in a small amount and at high yield.

The invention claimed is:

1. A process for producing an unstretched film comprising heating and melting thermoplastic resins and ejecting and extruding them through an extrusion T-die onto a casting roll,
    wherein a thermoplastic resin A and another thermoplastic resin B to form an unstretched film are separately heated and melted,
    the other thermoplastic resin B is led to both edges of an extrusion T-die,
    wherein the melt viscosity of thermoplastic resin A is lower than the melt viscosity of the other thermoplastic resin B,
    the difference in the melt viscosity between the thermoplastic resin A and the other thermoplastic resin B is at most 3000 poises at a shear rate of from 20 to 500 sec−1,
    the two resins are ejected and extruded onto the casting roll in such a manner that the other thermoplastic resin B melt can coexist on both sides of the heated and melted thermoplastic resin A to thereby form an unstretched film where the other thermoplastic resin B coexists on both sides of thermoplastic resin A,
    wherein, in a feed block, the cross section of the lower part of a resin melt supply duct to which thermoplastic resin A is fed is rectangular, and the cross section of holes to be formed on both sides of the lower part of the resin melt supply duct to which the thermoplastic resin B is fed is rectangular,
    the cross-sectional shape of the unstretched film is so formed is formed by thermoplastic resin A and thermoplastic resin B,
    wherein thermoplastic resin B coexists on both sides of thermoplastic resin A and the width of thermoplastic resin B is substantially uniform in the cross direction of the unstretched film, and
    thereafter the other thermoplastic resin part is cut off.

2. The process for producing an unstretched film as claimed in claim 1, wherein thermoplastic resin A and the other thermoplastic resin B are ejected out through the extrusion T-die to form the unstretched film in such a manner that the other thermoplastic resin B may form only a part inevitably thicker than the part of thermoplastic resin A.

3. The process for producing an unstretched film as claimed in claim 1, wherein the other thermoplastic resin B is a colored thermoplastic resin.

4. A process for producing an unstretched film comprising heating and melting thermoplastic resins and ejecting and extruding them through an extrusion T-die onto a casting roll,
    wherein a thermoplastic resin A and another thermoplastic resin B to form an unstretched film are separately heated and melted,
    the other thermoplastic resin B is led to both edges of an extrusion T-die,
    wherein the melt viscosity of thermoplastic resin A is lower than the melt viscosity of the other thermoplastic resin B,
    the difference in the melt viscosity between the thermoplastic resin A and the other thermoplastic resin B is at most 3000 poises at a shear rate of from 20 to 500 sec−1,
    the two resins are ejected and extruded onto the casting roll in such a manner that the other thermoplastic resin B melt can coexist on both sides of the heated and melted thermoplastic resin A to thereby form an unstretched film where the other thermoplastic resin B coexists on both sides of thermoplastic resin A,
    wherein, in a feed block, the cross section of the lower part of a resin melt supply duct to which thermoplastic resin A is fed is rectangular, and the cross section of holes to be formed on both sides of the lower part of the resin melt supply duct to which the thermoplastic resin B is fed is rectangular,
    the cross-sectional shape of the unstretched film is so formed is formed by thermoplastic resin A and thermoplastic resin B, wherein thermoplastic resin B coexists on both sides of thermoplastic resin A and the width of thermoplastic resin B is substantially uniform in the cross direction of the unstretched film,
    wherein thermoplastic resin A and the other thermoplastic resin B are heated and melted separately in different extruders, and fed to a resin melt supply duct connected to the respective extruders,
    the heated and melted thermoplastic resin A and the other thermoplastic resin B are fed to the feed block where holes are formed on both sides of the lower part of the resin melt supply duct to which thermoplastic resin A is fed and the end of the resin melt supply duct to which the other thermoplastic resin B is fed is connected with each hole formed on both sides thereof,
    the shapes of thermoplastic resin A and the other thermoplastic resin B are widened through a manifold connected to the feed block and extruded out through a die lip of the extrusion T-die onto a casting roll in such a condition that the other thermoplastic resin B coexists on both sides of thermoplastic resin A, and
    thereafter the other thermoplastic resin part is cut off.

5. The process for producing an unstretched film as claimed in claim 4, wherein the thermoplastic resin A and the other thermoplastic resin B are ejected out through the extrusion T-die to form the unstretched film in such a manner that the other thermoplastic resin B may form only a part inevitably thicker than the part of the thermoplastic resin A.

* * * * *